Aug. 27, 1946.    J. L. LANDRUM    2,406,612
AUTOMATIC HYDRAULIC CLUTCH
Filed Nov. 7, 1942    4 Sheets-Sheet 3

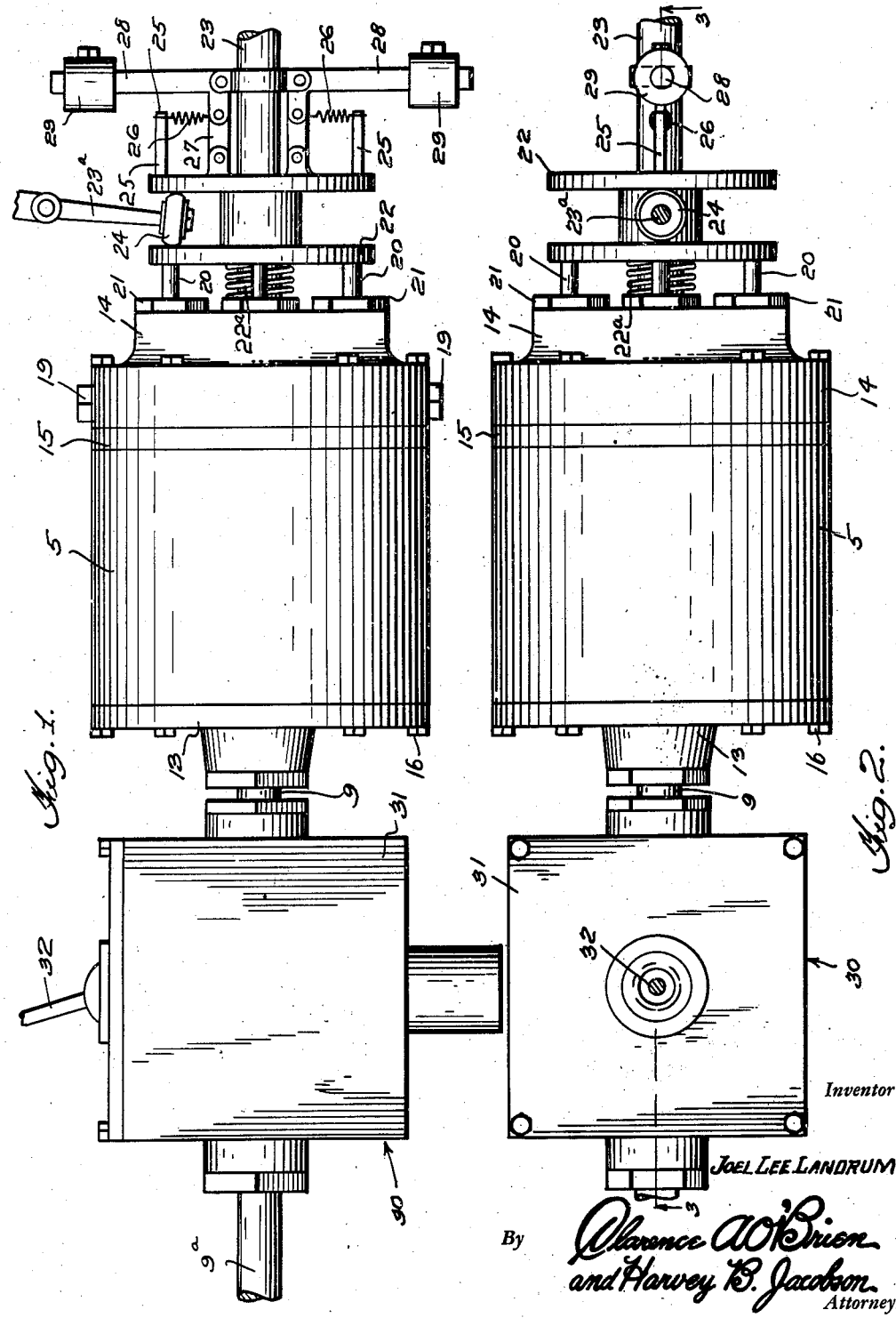

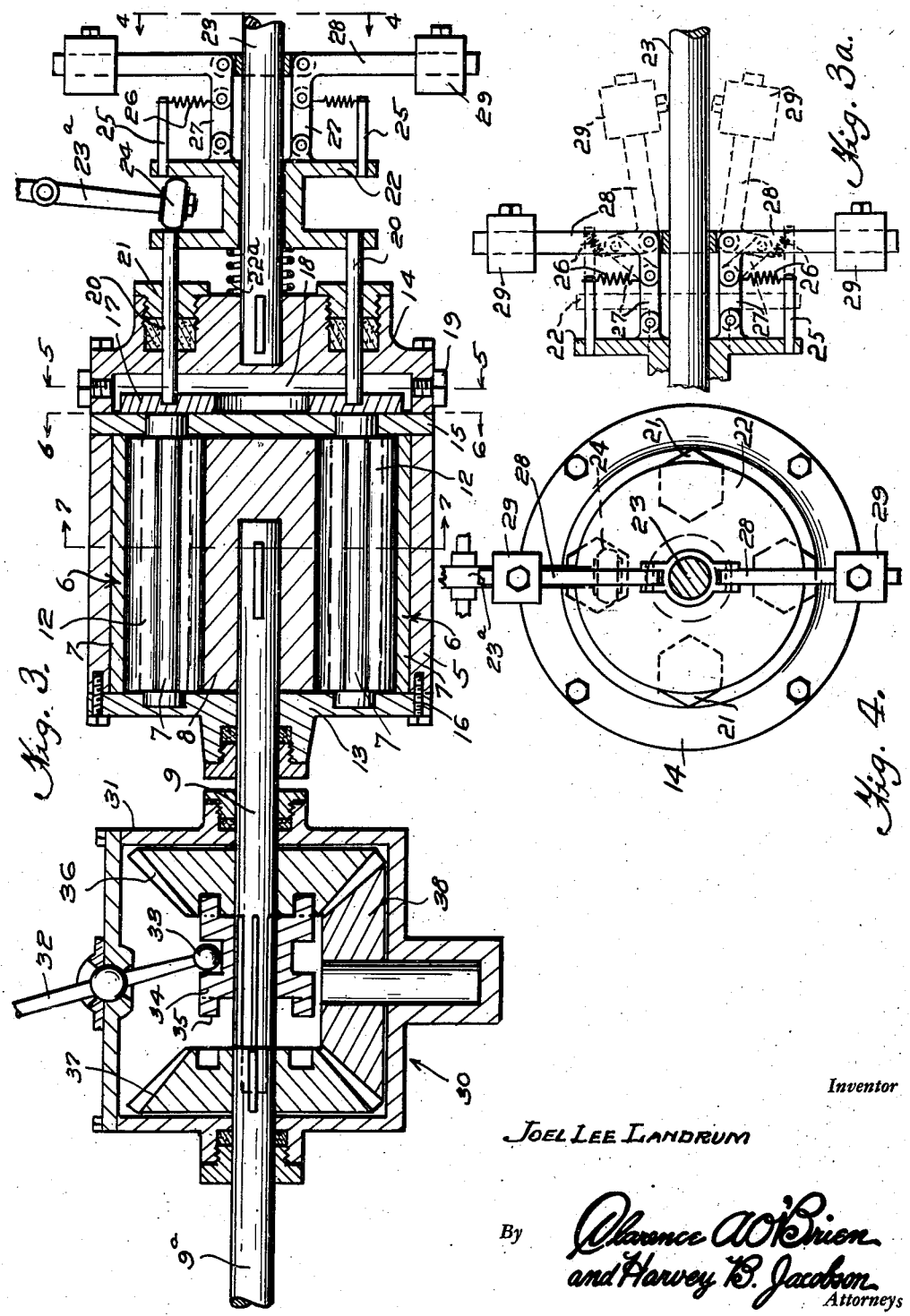

Inventor

JOEL LEE LANDRUM

By Clarence A. O'Brien
and Harvey B. Jacobson
Attorneys

Aug. 27, 1946.    J. L. LANDRUM    2,406,612
AUTOMATIC HYDRAULIC CLUTCH
Filed Nov. 7, 1942    4 Sheets-Sheet 4

Inventor

JOEL LEE LANDRUM

By Clarence A. O'Brien
and Harvey B. Jacobson
Attorneys

Patented Aug. 27, 1946

2,406,612

UNITED STATES PATENT OFFICE 2,406,612

AUTOMATIC HYDRAULIC CLUTCH

Joel Lee Landrum, Marfa, Tex.

Application November 7, 1942, Serial No. 464,868

2 Claims. (Cl. 192—61)

This invention relates to new and useful improvements in transmissions especially adapted for use in conjunction with motor vehicles of the type including an automatic hydraulic clutch and speed changing mechanism.

The principal object of the present invention is to provide a transmission of the character described which includes automatic hydraulic clutch mechanism cooperative with speed changing mechanism which contemplates to operate smoothly in a positive acting manner and constructed in such a manner as to not be susceptible to the ready development of defects.

Other objects and advantages of the invention will become apparent to the reader of the following description.

In the drawings:

Figure 1 is a side elevational view.

Figure 2 is a top plan view.

Figure 3 is a longitudinal sectional view.

Figure 3a is a detail in longitudinal sectional view of the right end of the structure shown in Figure 3, illustrating the parts in another position during operation.

Figure 4 is a section on the line 4—4 of Figure 3.

Figure 5:
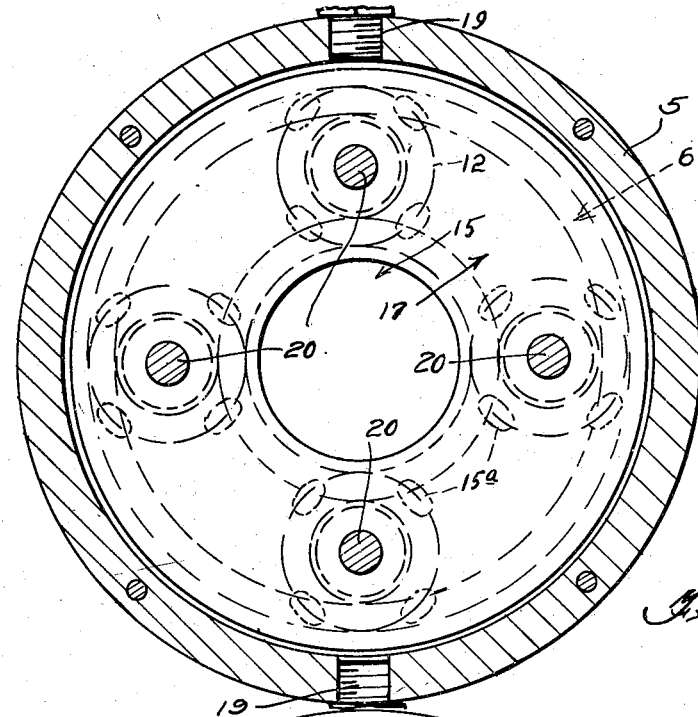
Figure 5 is a cross section on the line 5—5 of Figure 3.

Referring to the drawings wherein like numerals designate like parts, it can be seen that numeral 5 denotes a shell in which is located a sleeve 6 having longitudinally extending teeth 7.

Figure 6:
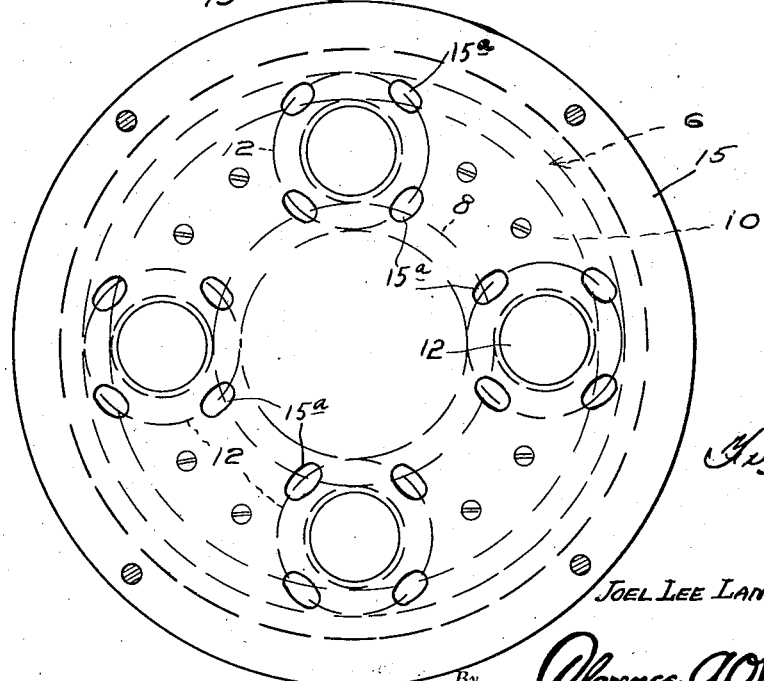
Figure 6 is a cross section on the line 6—6 of Figure 3.
Figure 7:
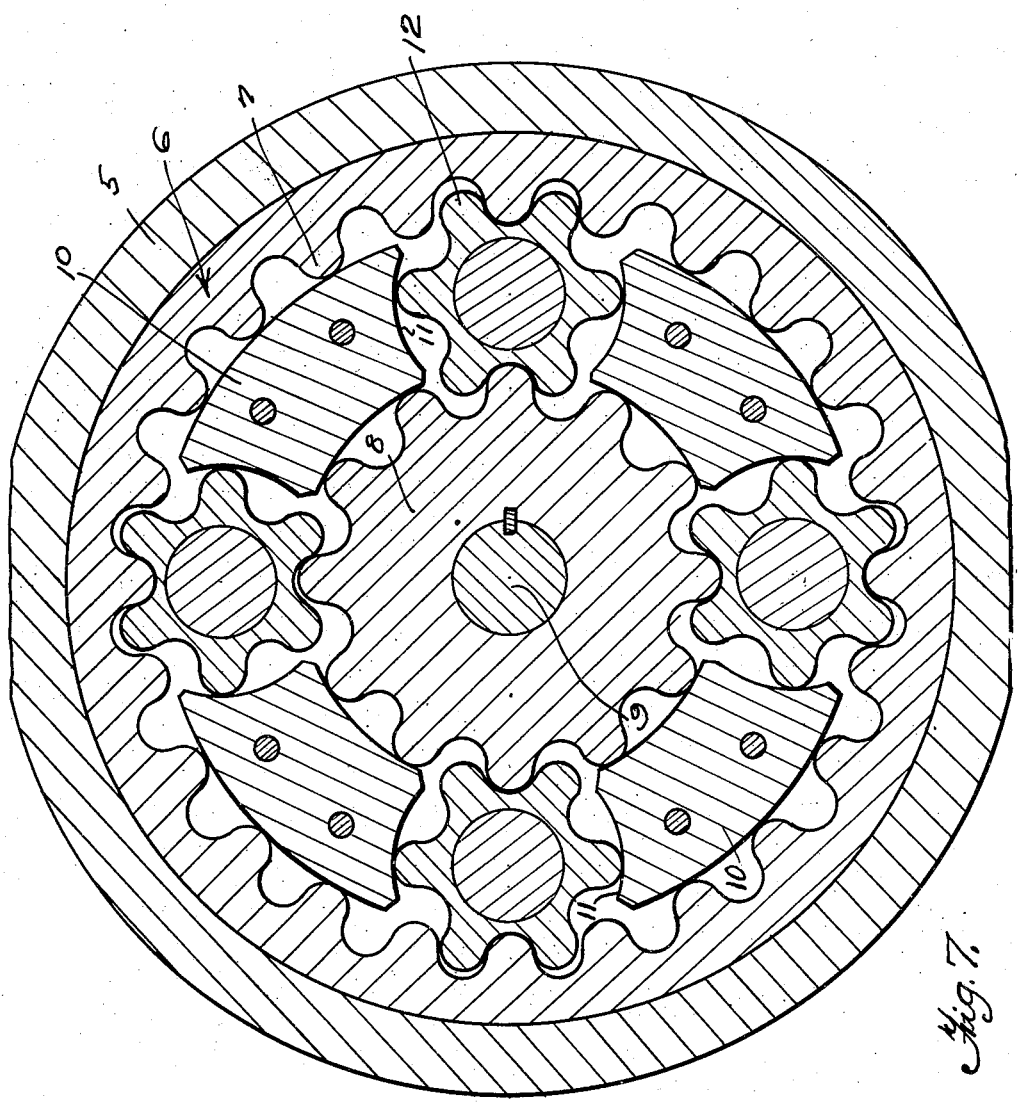
Figure 7 is a cross section on the line 7—7 of Figure 3.

Referring now to the drawings in detail, it will be seen that the invention comprises a set of longitudinal gears, so arranged as to form a multiple series of gear pumps, for the purpose of pumping a fluid such as oil (see Fig. 3). The numeral 8 denotes a sun gear secured to a driven shaft 9, and 12 denotes a set of four planetary gears (more or less than four may be used) which mesh with the sun gear 8, and a co-acting sleeve gear 7. The latter gear 7, is a "floating" gear. The numerals 10 denote partitioning blocks, each of which has four arcuate sides, and 5 denotes an outer cylindrical shell, or casing, in which the preceding parts are properly housed (see Fig. 3). The numeral 13 denotes a head, which is secured to shell 5 with screws 16, said head having a packing gland through which shaft 9 extends. The numeral 15 denotes another dischead, secured to the shell 5 with screws. The elongated planetary gears 12 are journaled for rotation between and in said heads 13 and 15 (see Figs. 3 and 6). Head 15 carries four ports 15a (Fig. 6) around the perimeter of each of the planetary gears, through which fluid is pumped back and forth, these ports being in properly arranged pairs. Half of the ports are around the perimeter of the sun gear 8, and the other half of the ports are adjacent to the sleeve gear 7; a total of sixteen ports, half of which are intake ports and the other half discharge ports.

The numeral 14 denotes a special head which is secured to said head 15 by bolts, and shaped to form a cavity or chamber 18, through which the fluid is pumped from port to port in head 15. Head 14 carries four packing glands 21, through which stems 20 extend. A ring plate 17 in cavity 18 is used to open and close all sixteen ports 15a in head 15. This ring plate 17 is secured for operation to the four stems 20, and these stems 20 are secured to a spool 22, slidably mounted on shaft 23. A floating lever 23a is used for supplemental manual control (see Fig. 3). The sector or segmental partition blocks 10 are secured to the heads 13 and 15 with screws, and, as shown in Figure 3, 24 is a roller on lever 23a which projects into spool 22. The anchors 25 are for coiled springs 26, and said springs 26 are secured to links 27, the latter hinged to spool 22. Bell cranks or weighted levers 28 are hinged to a hub on shaft 23, centrifugal weights 29 are adjustable along levers 28. The coiled spring 22a around shaft 23 and between the head 14 and the spool 22 is used in conjunction with springs 26 to retard the outward swing of the centrifugal weights 29 and thus the spring means compels the intake and discharge ports to be opened and closed gradually by the action of said weights 29.

Numeral 30 denotes a reversing gear unit, which is associated with the intermediate shaft 9. This unit 30 includes a box 31 into which extends a hand lever 32 having a ball 33 operating in a slide spool 34 provided with teeth 35 at the ends thereof. The spool is splined to the intermediate shaft 9 and is adapted to have its end teeth engageable either with a bevel gear 36 or a bevel gear 37. The gear 36 is not keyed to the intermediate shaft 9, while the gear 37 is keyed to the driven shaft 9a. Both of the gears 36, 37 mesh with an intermediate idler gear 38.

The above-described springs 26, and centrifugal weights 29 constitute the automatic port opening and closing device or governing device, for which I do not claim anything especially new, but it is necessary to use such means in conjunction with the transmission and clutching device to prevent the motor sticking or stalling when it is suddenly overloaded.

Having described the different parts of the device, I will endeavor to explain its operation as follows:

With the motor running, the sleeve gear 7 will be rotating or "floating" freely inside the shell 5 revolving around the planetary gears, and the gears will be pumping and circulating fluid back and forth through the ports 15a in the head 15. To start the vehicle moving, the operator will grasp the floating lever 23a and begin to close said ports gradually. The restriction of the circulation of the fluid by the closing of the ports will transmit the motion of the shaft 9 through the journals of the planetary gears 12 to the heads 13 and 15 to the drive shaft 23. As the vehicle is now in motion, the floating lever 23a will be released by the operator, and the automatic governor will take over and be in control.

It is obvious that when the vehicle is slowed by any cause, the governing device will open the ports causing speed changing ratios according to the extent the ports are open.

In Figure 5, 19 denotes filler plugs, through which the device will be completely filled with fluid, filling all the spaces between the gears and the partitions and between the sleeve gear and the outside shell 5.

This invention comprehends new and useful improvements in transmissions especially adapted for use in conjunction with motor vehicles of the type including an automatic hydraulic clutch and speed changing mechanism, and is especially designed for use in conjuction with internal combustion engine driven railroad trains, to take the place of electric generators and the electric motors now used on "Diesel" electric railroad engines. Incidentally, the reason electric generators and motors are now used on trains is because a suitable and efficient transmission had not been devised that could handle a large railroad train. My transmission will be useful wherever a clutch and transmission is used. An outstanding result of the present invention is to provide a transmission of the character described which includes automatic hydraulic clutch mechanism cooperative with speed changing mechanism which operates smoothly in a positive manner and is constructed in such a manner as to not be susceptible to the ready development of operational and mechanical defects.

While the foregoing specification sets forth the invention in specific terms, it is to be understood that numerous changes in the shape, size and materials may be resorted to without departing from the spirit and scope of the invention as claimed hereinafter.

Having described my invention, what is claimed as new is:

1. A hydraulic automatic-type clutch comprising a horizontally elongated cylindrical shell constituting a housing, a driven shaft journaled for rotation in one end of the housing and projecting into the interior thereof, an elongated sun gear keyed to said driven shaft and located centrally between the opposite ends of the housing and of a length commensurate with the housing, a sleeve of a length corresponding to the housing and located on the interior thereof and in movable contact with the inner peripheral surface of the rim of the housing, said sleeve being internally ribbed to provide teeth opposed to the teeth on said sun gear, a plurality of equidistant spacing and partitioning blocks mounted in said housing between the sun gear and sleeve gear, elongated planetary gears mounted for idling between the adjacent ends of the partitioning blocks and also between the sun gear and sleeve gear and simultaneously meshing with the teeth of said sun and sleeve gears, together with a plurality of intake and discharge ports formed at one end of the housing, fluid-trapping, circulating and port-enclosing means associated with the ports, and valve means coacting with and simultaneously opening and closing all of said ports.

2. A heavy duty hydraulic clutch comprising a horizontally elongated cylinder constituting a housing and having disc-closing heads at opposite ends, a driven shaft journaled for rotation in the bearing in one of said heads and projecting into the central region of the housing, a longitudinally elongated sun gear keyed on said driven shaft and confined in said housing, a correspondingly elongated sleeve mounted for free rotation in the housing and in moving contact with the inner peripheral surface of the rim of the housing and provided with internal ribs constituting gear teeth, equidistant circumferentially spaced planetary gears mounted for idling in the housing heads and interposed between the sleeve gear and sun gear, equidistant circumferentially spaced sector-shaped partitioning blocks fixedly mounted between the sun gear, sleeve gear and planetary gears, the outer surfaces of said partitions being convex, the inner longitudinal surfaces concave and the opposite longitudinal edges being concave, one of the heads of said housing being provided with inner and outer rows of intake and discharge ports, the ports being in circumferentially spaced pairs, the inner pairs being cooperable at the meshing points between the planetary gears and sun gear, the outer pairs being located for coaction between and with the planetary gears and surrounding sleeve gear, said ports being adapted to be enclosed in a valved housing in which the valve controls the opening and closing of the ports, in the manner and for the purposes described.

JOEL LEE LANDRUM.